United States Patent [19]

Dunlap

[11] 4,411,384
[45] Oct. 25, 1983

[54] HEAT DRIVEN HEAT PUMP USING PAIRED AMMONIATED SALTS

[75] Inventor: Richard M. Dunlap, Middletown, R.I.

[73] Assignee: The United States of America as represented by the Secretary of the Navy, Washington, D.C.

[21] Appl. No.: 182,367

[22] Filed: Aug. 29, 1980

[51] Int. Cl.$^3$ .................. G05D 23/00; F25B 13/00
[52] U.S. Cl. .................. 237/2 B; 237/1 R; 62/324.2; 122/21
[58] Field of Search .................. 237/2 B, 1 R; 165/29, 165/1, 107 D; 62/480, 324.2, 238.3, 476; 122/21

[56] References Cited

U.S. PATENT DOCUMENTS 4,319,626 3/1982 Papazian et al. .................. 165/1

OTHER PUBLICATIONS

Haas, W., Jaeger, F., Howerton, M., Thermochemical Energy Storage and Heat Pump System Using Ammoniated Salts, Solar Energy Storage Options D.O.E., San Antonio Texas, pp. 473-487, Mar. 19-20, 1979.
Bowgard, Solar Energy and Low Level Cyclic Energy Flow (20° to 100° C.) Storage as Chemical Bond Energy of Compounds Undergoing Thermal Decomposition, Feb. 1979, pp. 165-189.
Hiller, C. & Clark, E., "Chemical Heat Pump/Chemical Heat Storage System", American Chemical Society, 1979.
Brown, F., "Methanol Based Heat Pump for Storage of Solar Thermal Energy", American Chemical Society, 1979.

Primary Examiner—Albert J. Makay
Assistant Examiner—Henry Bennett
Attorney, Agent, or Firm—Robert F. Beers; Arthur A. McGill; Prithvi C. Lall

[57] ABSTRACT

A cycle for a heat driven heat pump using two salts $CaCl_2.8NH_3$ and $ZnCl_2.4NH_3$ which may reversibly react with ammonia with the addition or evolution of heat. These salts were chosen so that both ammoniation processes occur at the same temperature so that the heat evolved may be used for comfort heating. The heat to drive the system need only be slightly hotter than 122° C. The low temperature source need only be slightly warmer than 0° C.

3 Claims, 2 Drawing Figures

HEAT DRIVEN HEAT PUMP USING PAIRED AMMONIATED SALTS

STATEMENT OF GOVERNMENT INTEREST

The invention described herein may be manufactured and used by or for the government of the United States of America for governmental purposes without the payment of royalties thereon or therefor.

BACKGROUND OF THE INVENTION

The present invention generally relates to a heating system and more particularly to a heat driven heat pump that uses waste heat and extracts free heat from the ambient at a low temperature and delivers heat at 55° C. for the purpose of space heating for comfort at 20° C. The pressures used are much lower than if liquid ammonia were used.

SUMMARY OF THE INVENTION

The heat pump employs the ammoniates of $CaCl_2$ and $ZnCl_2$ to reversibly absorb ammonia, the working fluid. No work is done in the process; no motor or compressor is required. The system employs a pair of reservoirs, each having a pair of heat exchange loops. The reservoirs transfer gaseous ammonia back and forth depending on which part of a cycle the system is operating on. The receipt of the gaseous ammonia in a reservoir causes the deammoniated calcium chloride or zinc chloride to ammoniate and thereby release heat for space heating purposes.

DESCRIPTION OF THE PREFERRED EMBODIMENT

Figure 1:
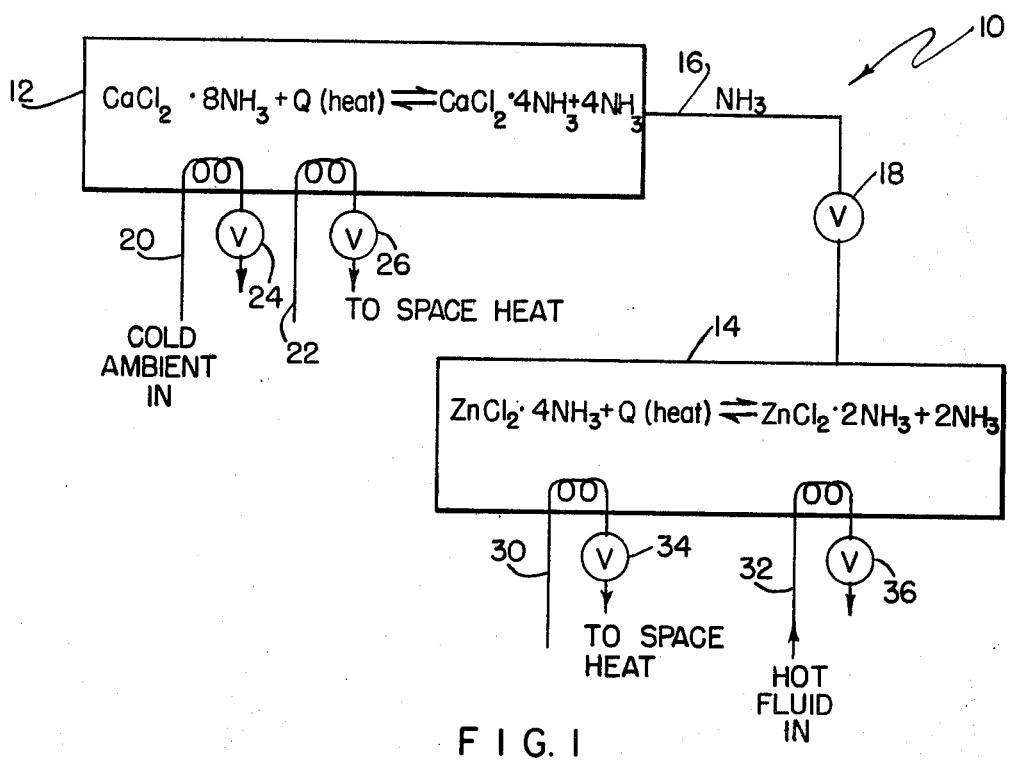
FIG. 1 is a schematic diagram of a heat driven heat pump system using paired ammonium salts in accordance with the present invention.

Referring to FIG. 1 there is shown a diagram of a heat driven heat pump 10 having reservoirs 12 and 14. Reservoir 12 contains ammoniated calcium chloride $CaCl_2.8NH_3$ amd reservoir 14 contains ammoniated zinc chloride $ZnCl_2.4NH_3$. The two reservoirs 12 and 14 are connected by piping 16 having a valve 18 to permit the flow of gaseous ammonia $NH_3$.

Reservoir 12 has two heat exchange loops 20 and 22 equipped with respective valves 24 and 26. Loop 20 is connected to receive atmospheric air or water from a well, a pond, or the sea at ambient winter temperature. Loop 22 receives air or water from space heating convectors at some temperature less than the comfort level, assumed to be 20° C., but greater than the ambient temperature assumed to be 0° C. The fluid in loop 22 is heated in reservoir 12. The fluid in loop 22 is then discharged at a temperature somewhat higher than 20° C. to heat the space.

Reservoir 14 has two heat exchange loops 30 and 32 equipped with respective valves 34 and 36. Loop 30, similar to loop 22 receives fluid at a temperature between 0° C. and 20° C. and returns warm fluid for space heating purposes. Loop 32 receives high temperature fluid which serves to heat the $ZnCl_2.4NH_3$ to deammoniate it.

The operation of the device is divided into two phases. In phase one, valves 18, 24 and 34 are open; valves 26 and 36 are closed. Initially the calcium chloride in reservoir 12 is in state A, the fully ammoniated state, $CaCl_2.8NH_3$ and the zinc chloride is in the lower ammoniated state, $ZnCl_2.2NH_3$. Both reservoirs 12 and 14 are approximately at room temperature of 20° C. The pressure in reservoir 12 is reduced to 0.132 atm, which is state B, by allowing its contents to cool to 0° C. The pressure in reservoir 14 at this time is very much less than 0.132 atm. Then as heat is added to reservoir 12 from the ambient source, four moles of ammonia are dissociated leaving $CaCl_2.4NH_3$. This ammonia gas $NH_3$ flows through piping 16 and valve 18 into reservoir 14. There, the ammonia gas $NH_3$ ammoniates the $ZnCl_2.2NH_3$ to the higher ammoniate, $ZnCl_2.4NH_3$ with the release of heat which is transferred through heat exchange loop 30 to the space to be heated. This continues until either all the $CaCl_2.8NH_3$ has been changed to $CaCl_2.4NH_3$ or all the $ZnCl_2.2NH_3$ has been changed to $ZnCl_2.4NH_3$. Ideally both should occur simultaneously.

When the above is completed phase two is begun. In this phase valves 24 and 34 are closed; valves 18, 26 and 36 are open. Heat is added to the $ZnCl_2.4NH_3$ from the high temperature source via loop 32 by raising, by heat exchanging means, the temperature of reservoir 14 to 122° C. and the pressure to 3.23 atmospheres, state E. Continued addition of heat dissociated two moles of ammonia $2NH_3$ from the $ZnCl_2.4NH_3$ returning it to the lower ammoniated state, $ZnCl_2.2NH_3$. Due to the lower pressure in reservoir 12 the ammonia gas $2NH_3$ flows into it through valve 18 and piping 16. This ammoniates the $CaCl_2.4NH_3$ to $CaCl_2.8NH_3$ with the release of heat Q, state F. This heat is transferred via loop 22 and valve 26 to the space to be heated. When the reactions in reservoirs 14 and 12 are completed, valve 36 is closed. Both reservoirs 12 and 14 gradually reach the temperature of the space being heated.

Since the ammoniation of $ZnCl_2$ involves a change of only two moles of ammonia and the ammoniation of $CaCl_2$ involves a change of four moles of ammonia, there should be twice as many moles of $ZnCl_2$ as $CaCl_2$.

Figure 2:
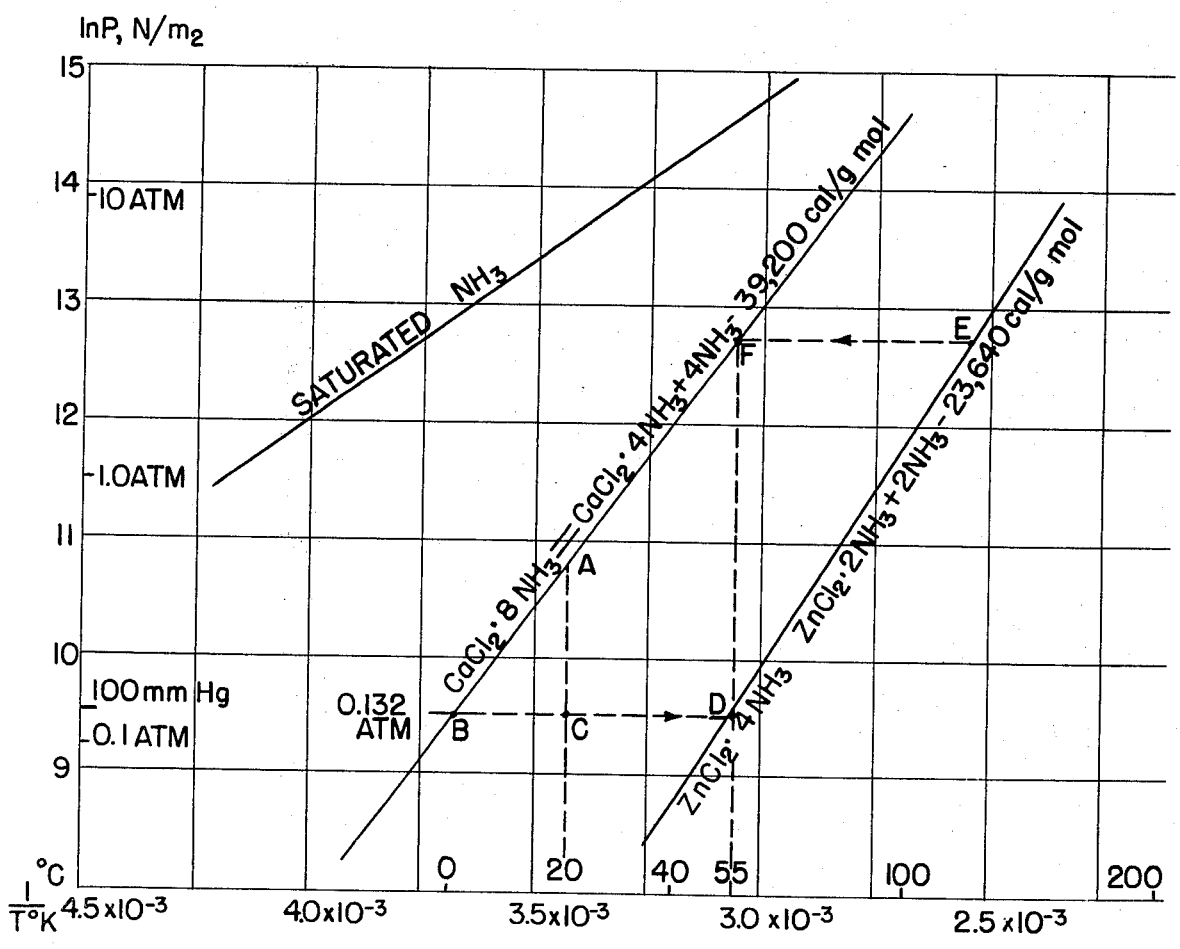
FIG. 2 is a pressure vs. temperature plot showing the cycle of the heat driven heat pump system of FIG. 1.

The cycle for the above system is a $\ln/P$ vs. $T^{-1}$ plot shown in FIG. 2. These coordinates were chosen since in its simplified form the Clausius-Clapeyron Equation may be written $$L = Rd(\ln/P)/d(T^{-1})$$

where
  $L$ = molal latent heat of vaporization
  $R$ = universal gas constant = 1.9872 cal/gm-mol-°K.
  $P$ = pressure
  $T$ = absolute temp. °K.
There is shown the saturation curves of ammonia gas in equilibrium with:
  its liquid phase,

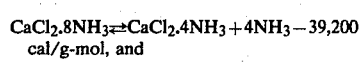

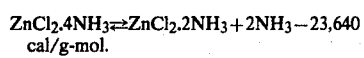

The following explanation of the operation while referring to FIG. 2 can be further understood by taking the above explanation of FIG. 1 into consideration.

Starting at state A where the $CaCl_2.8NH_3$ is at room temperature, 20° C., the $CaCl_2.8NH_3$ is cooled by the ambient just above $T_B$. At state B the ambient supplies heat to reduce the $CaCl_2.4NH_3$ with the evolution of $4NH_3$. The $4NH_3$ flows with a slight pressure drop and the addition of heat to state D where it ammoniates $ZnCl_2.2NH_3$ to $ZnCl_2.4NH_3$ with the evolution of heat at 55° C. which is used for the space heating. This higher ammoniate is then heated to state E at constant volume to a much higher pressure where $NH_3$ is evolved and permitted to flow through a slight pressure drop with the loss of heat to state F where it ammoniates $CaCl_2.4NH_3$ to $CaCl_2.8NH_3$ with release of heat at 55° C. to the space to be heated. Further heat release to the space to be heated returns the $CaCl_2.8NH_3$ to state A, the starting point.

In the intermittent process $CaCl_2.4NH_3$ is heated at constant volume from state B to state F and $ZnCl_2.2NH_3$ is cooled at constant volume from state E to state D.

An important aspect of the system is that the two pressure levels $P_F$ and $P_D$ and the two salts are selected so that $T_F = T_D$ is sufficiently higher than $T_A$ so that heat transfer may be effective without excessive investment in heat transfer area. Thus, both the ammoniation processes yield heat at $T_F = T_D$ for space heating. This also avoids an excessive temperature at E, ($t_E$ = 122.1° C.), making it possible to use solar heat with only simple concentrators. The coefficient of performance as a heat pump is 1.562. Tabulated in Table I are the states and processes. The cycle computations are given below.

Computations:

From Dulong-Petit: $C_V$ atomic = 5.9 cal/g-atom.C
From Kopp: $C_V$ atomic additive to form compounds.

|  | No. of Atoms | $C_V$ molal on $NH_3$ |
|---|---|---|
| per g-mol | $C_V$: $CaCl_2.8NH_3$ 35 × 5.9/4 | 51.63 |
| $NH_3$ evolved | $CaCl_2.4NH_3$ 19 × 5.9/4 | 28.03 |
|  | $ZnCl_2.2NH_3$ 19 × 5.9/4 | 56.05 |
|  | $ZnCl_2.2NH_3$ 11 × 5.9/2 | 32.45 |
|  |  | Cal/°C.-g-mol $NH_3$ evolved. |

$C_P$ $NH_3$ per Touloukian

@ 40° = .49 use .50 cal/gm°C. = 8.52 cal/gm mol $NH_3$.°C.

|  | No. of Atoms | $C_V$ molal on $NH_3$ |
|---|---|---|
| @ 100° | .50 × 17.03 |  |

$Q_{AB} = C_V \Delta T = 51.63 \times 20 = -1032.6$ cal/g-mol $NH_3$
$Q_B = 39,200/4 = +9800$
$Q_{BC} = C_P \Delta T = 8.52 \times 20 = +170.40$
$Q_{CD} = 8.52 \times 35 = +298.20$
$Q_D = 23,640/2 = -11820$
$Q_{DE} = 56.05 (122.1-55) = +3962.3$
$Q_E = 23,640/2 = +11820$
$Q_{EF} = 8.52 \times (122.1-55) = -571.69$
$Q_F = -Q_B = -9800$
$Q_{FA} = 51.63 (55-20) = -1807.1$
$Q_{BA} = 28.03 \times 20 = +560.6$
$Q_{AF} = 28.03 \times 35 = 981.1$
$Q_{ED} = 32.45.67.1 = 2177.4$ Regeneration during Heat Pump Portion:
  Part of $Q_{AB}$ provides all of $Q_{BC}$; remainder dumped to ambient
  Part of $Q_{FA}$ provides all of $Q_{CD}$; remainder goes to space heat
  All of $Q_{EF}$ provides part of $Q_{DE}$; remainder of $Q_{DE}$ comes from high temperature heat source.

Regeneration During Restoration:
  Some of $Q_{ED}$ provides all of $Q_{BF}$; remainder goes to heat space $2177.4 - 1541.7 = 635.7 = Q_1$
  Net heat input at temperature above 55° C. = $Q_{DE} - Q_{EF} + Q_E = 3962.3 - 571.69 + 11820 = 15210.6$.
  Net heat output from 55° C. to 20° C. for comfort heating = $Q_D + Q_F$
  $(Q_{FA} - Q_{CD}) + Q = 1,820 + 9800 + 1807.1 - 298.2 + 635.7 = 23764.6$.
  Net heat input at temperatures below 20° C. = $Q_B + Q_{BC} - Q_{AB} = 9800 - 170.4 - 1032.6 = 8937.8$.

Heat Balance $Q_{in}$ at high temperature + $Q_{in}$ at low temperature − $Q_{out}$ to space − $0.15210.6 + 8937.8 = 23764.6 = 383.8 \approx 0$ The error is $383.8/23128.9 = 1.7\%$ which is not excessive.

As a heat pump the coefficient of performance is C.O.P. = Q to space/$Q_{in}$ at high temperature = $23764.6/15210.6 = 1.562$. Thus, each unit of heat from fuel is multiplied 1.562 and delivered to space for comfort heating.

TABLE 1

| | State | Process | lnP N/m² | psia | $T^{-1}$ °K$^{-1}$ | T°K | T°C | Heat Added (+) |
|---|---|---|---|---|---|---|---|---|
| | A | — | 10.82 | 7.25 | 3.411 × 10$^{-3}$ | 293.1 | 20. | — |
| | | cool V ≃ C | | | | | | −1032.6 |
| | B | deammoniate heat in | 9.501 | 1.94 | 3.661 × 10³ | 273.1 | 0. | +9800. |
| | | Heat P = C | | | | | | +170.4 |
| HEAT PUMP | C | — | 9.501 | 1.94 | 3.411 × 10$^{-3}$ | 293.1 | 20. | — |
| | | heat P = C | | | | | | +298.2 |
| | D | ammoniate heat out | 9.501 | 1.94 | 3.047 × 10$^{-3}$ | 328.1 | 55 | −11820 |
| | | heat V ≃ C | | | | | | +3962.3 |
| | E | deammoniate heat in | 12.70 | 47.47 | 2.53 × 10$^{-3}$ | 395.3 | 122.1 | +11820 |
| | | cool P = C | | | | | | −571.7 |
| | F | ammoniate heat out | 12.70 | 47.47 | 3.047 × 10$^{-3}$ | 328.1 | 55. | −9800 |
| | | cool ≃ C | | | | | | −1807.1 |
| | A | — | 10.82 | 7.25 | 3.411 × 10$^{-3}$ | 293.1 | 20 | — |
| RESTORATION TO NORMAL | | B to A | | | | | | +560.6 |
| | | | | | | | | 1541.7 |
| | | A to F | | | | | | +981.1 |
| | | E to D | | | | | | −2177.4 |

There has therefore been described an energy efficient heat pump using the ammoniates of calcium chloride and zinc chloride with ammonia as the working fluid. The process can be an intermittent process or a continuous one, although for the continuous process the ammoniates must be made liquid or at least pumpable by the addition of $NH_4NO_3$ or $LiNO_3$ which are liquid when they absorb ammonia, or the salts must be liquefied by the addition of an oily or liquid carrier. For the continuous process a pump for transferring liquefied $CaCl_2.4NH_3$ to high pressure must be provided. The work input required is minor. The deammoniated $ZnCl_2$ is allowed to flow through an expansion valve to low pressure without recovery.

It will be understood that various changes in the details, materials, steps and arrangement of parts, which have been herein described and illustrated in order to explain the nature of the invention may be made by those skilled in the art within the principle and scope of the invention as expressed in the appended claims.

What is claimed is:

1. A heat driven heat pump comprising:

a first ammoniated salt;

a second ammoniated salt;

a first heating source of ambient winter temperature for heating said first salt;

a second heating source of temperature higher than said first heating source, said second heating source for heating said second salt;

first means for applying heat to said first ammoniated salt from said first heating source for heating, increasing the pressure, and dissociating ammonia from said first ammoniated salt forming a first lower ammoniated salt and transferring the dissociated ammonia to said second ammoniated salt to further ammoniate said second ammoniated salt at a predetermined temperature forming a second higher ammoniated salt with the release of heat at said predetermined temperature and for providing comfort heating; and second means for applying heat to said second higher ammoniated salt from said second heating source for heating, increasing the pressure and dissociating ammonia from said second higher ammoniated salt, and transferring the dissociated ammonia to said first lower ammoniated salt to ammoniate said first lower ammoniated salt forming said first ammoniated salt at said predetermined temperature with the release of heat at said predetermined temperature and for providing comfort heating.

2. A heat driven heat pump according to claim 1 wherein said first ammoniated salt is $CaCl_2.8NH_3$ and said second ammoniated salt is $ZnCl_2.2NH_3$.

3. A heat driven heat pump according to claim 2 wherein said predetermined temperature is substantially 55° C.

* * * * *